(12) United States Patent
Tani et al.

(10) Patent No.: US 9,277,299 B2
(45) Date of Patent: Mar. 1, 2016

(54) LINE SWITCHING DEVICE

(75) Inventors: Shigeo Tani, Kashihara (JP); Takashi Umegaki, Osaka (JP)

(73) Assignee: FUJITSU LIMITED, Kawasaki (JP)

(*) Notice: Subject to any disclaimer, the term of this patent is extended or adjusted under 35 U.S.C. 154(b) by 462 days.

(21) Appl. No.: 13/571,461

(22) Filed: Aug. 10, 2012

(65) Prior Publication Data

US 2013/0094805 A1 Apr. 18, 2013

(30) Foreign Application Priority Data

Oct. 12, 2011 (JP) ................................ 2011-225191

(51) Int. Cl.
- G02B 6/26 (2006.01)
- G02B 6/42 (2006.01)
- G02B 6/28 (2006.01)
- H04Q 11/00 (2006.01)

(52) U.S. Cl.
CPC ........ *H04Q 11/00* (2013.01); *H04Q 2213/1301* (2013.01); *H04Q 2213/1302* (2013.01); *H04Q 2213/1304* (2013.01); *H04Q 2213/13367* (2013.01)

(58) Field of Classification Search
None
See application file for complete search history.

(56) References Cited

U.S. PATENT DOCUMENTS

| 5,256,958 | A | 10/1993 | Eng et al. |
| 5,555,243 | A | 9/1996 | Kakuma et al. |
| 6,836,353 | B1 * | 12/2004 | Ramadas et al. ............. 359/298 |
| 7,443,843 | B2 * | 10/2008 | Matsuo et al. ............... 370/386 |
| 2003/0026525 | A1 * | 2/2003 | Alvarez ......................... 385/16 |
| 2008/0304508 | A1 | 12/2008 | Kawaguchi et al. |

FOREIGN PATENT DOCUMENTS

| JP | 05-199574 | 8/1993 |
| JP | 06-112977 | 4/1994 |
| JP | 07-327036 | 12/1995 |
| JP | 2001-257689 | 9/2001 |
| JP | 2003-143171 | 5/2003 |
| JP | 2008-306482 A | 12/2008 |

OTHER PUBLICATIONS

JPOA—Office Action of Japan Patent Application No. 2011-225191 dated Apr. 28, 2015, with English translation of the relevant part, p. 1, line 21 to p. 3, line 14 of the Office Action.

* cited by examiner

*Primary Examiner* — Uyen Chau N Le
*Assistant Examiner* — Chad Smith
(74) *Attorney, Agent, or Firm* — Fujitsu Patent Center

(57) ABSTRACT

A line switching device includes multiple input ports to which signals are input and that include first input ports and second input ports different from the first input ports; multiple output ports that include given output ports; a branch unit that branches first signals input from the first input ports; and a switch that selectively outputs, among second signals input from the second input ports and branched signals branched from the first signals by the branch unit, signals that are to be switched to an output port among the given ports.

5 Claims, 17 Drawing Sheets

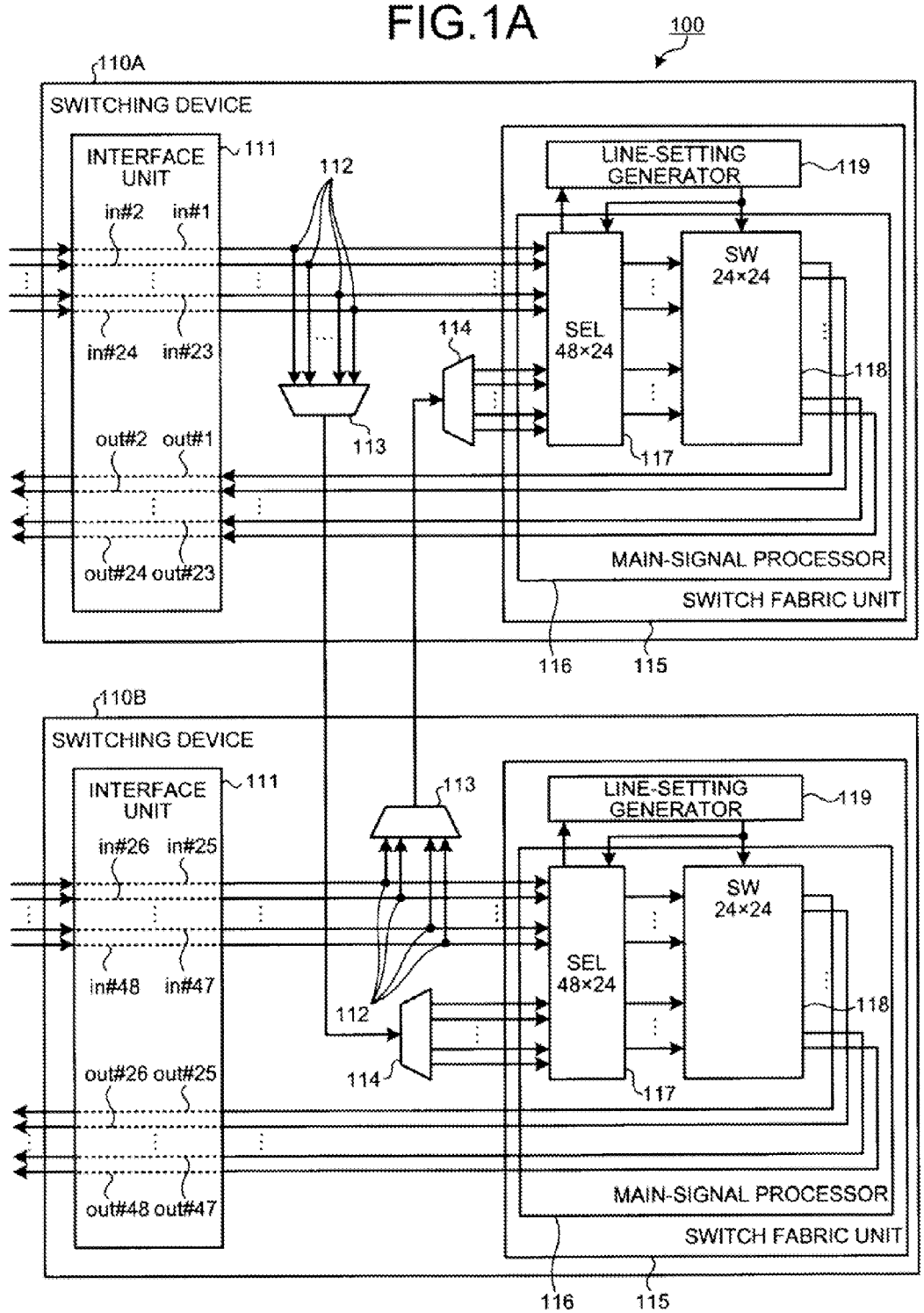

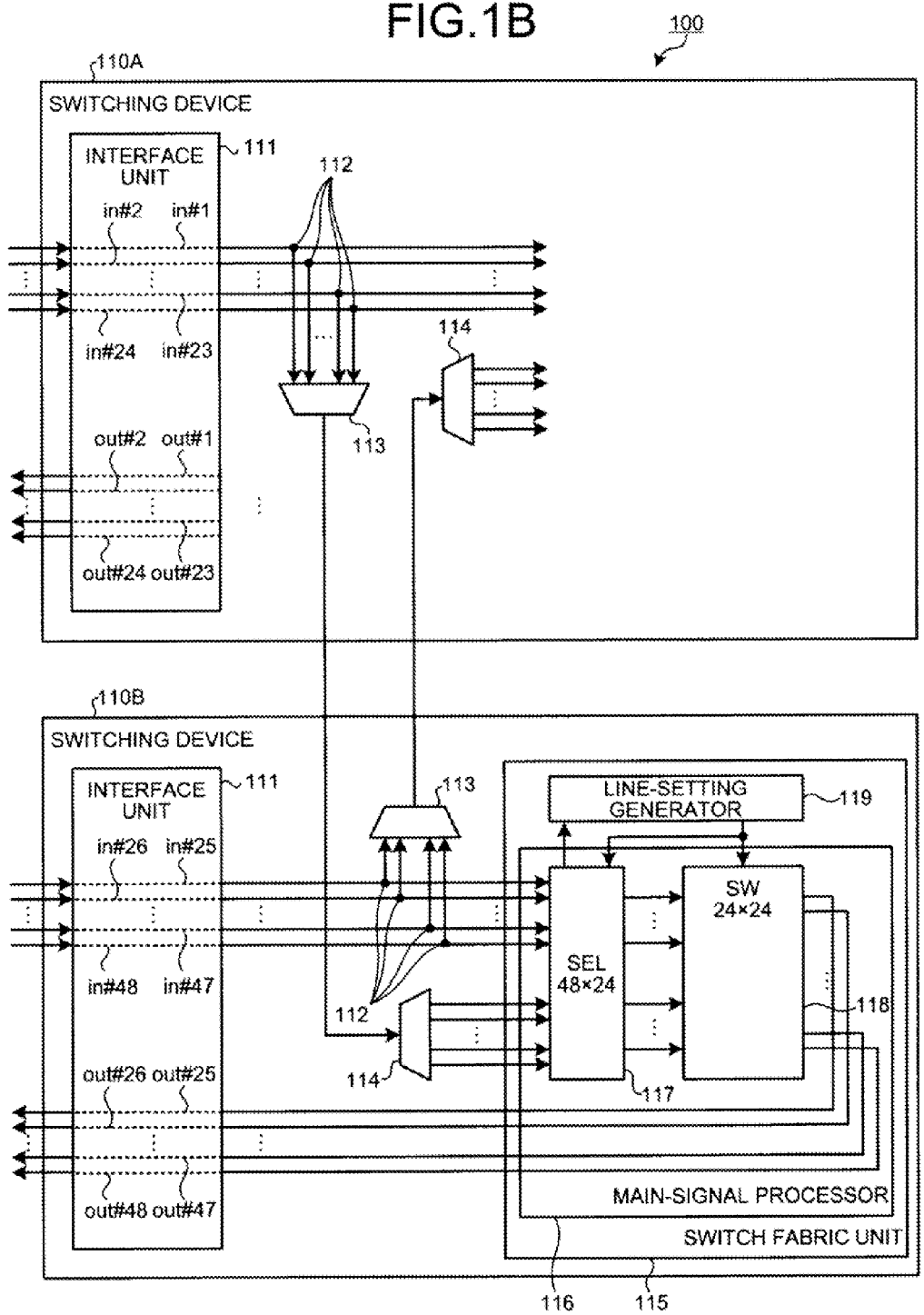

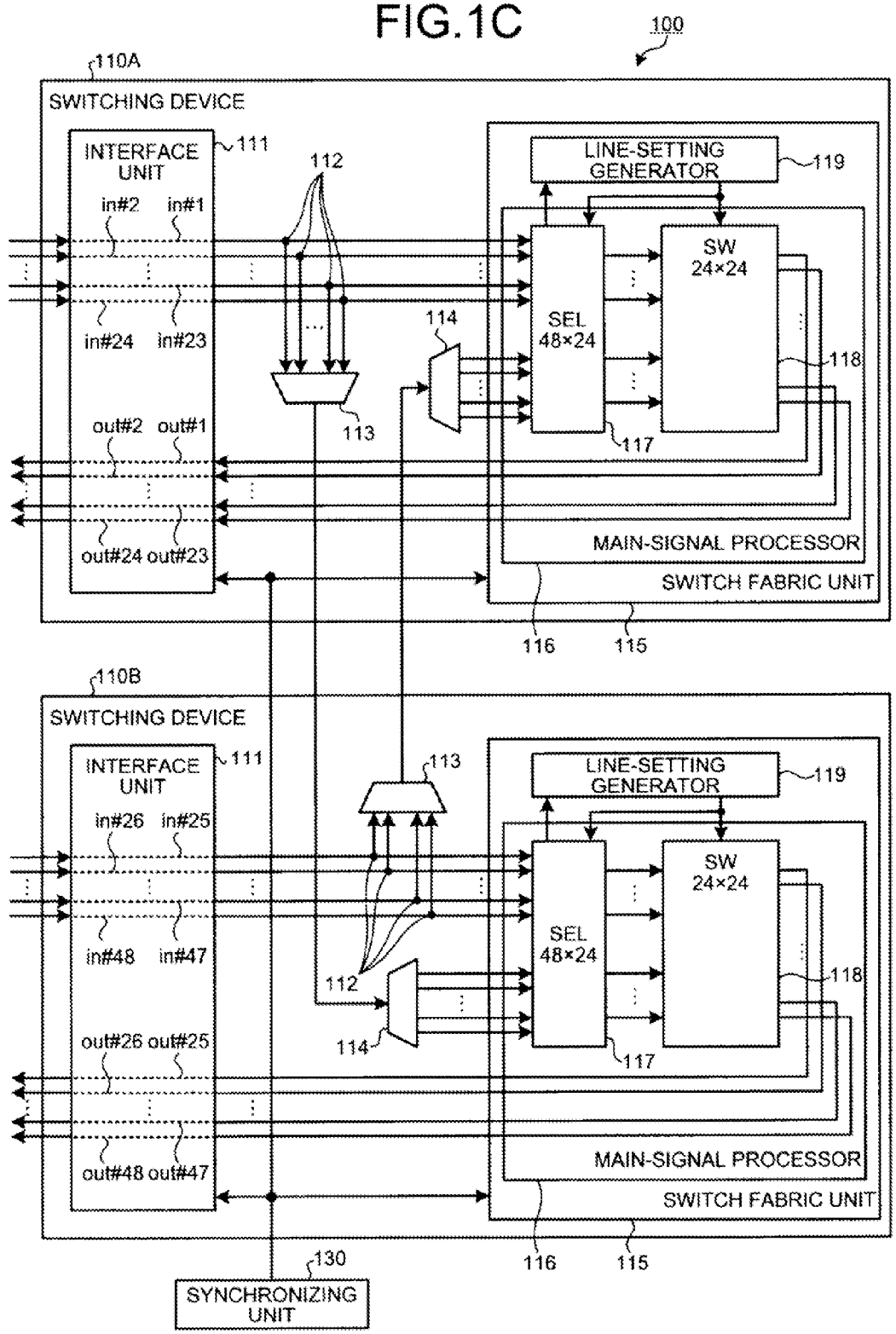

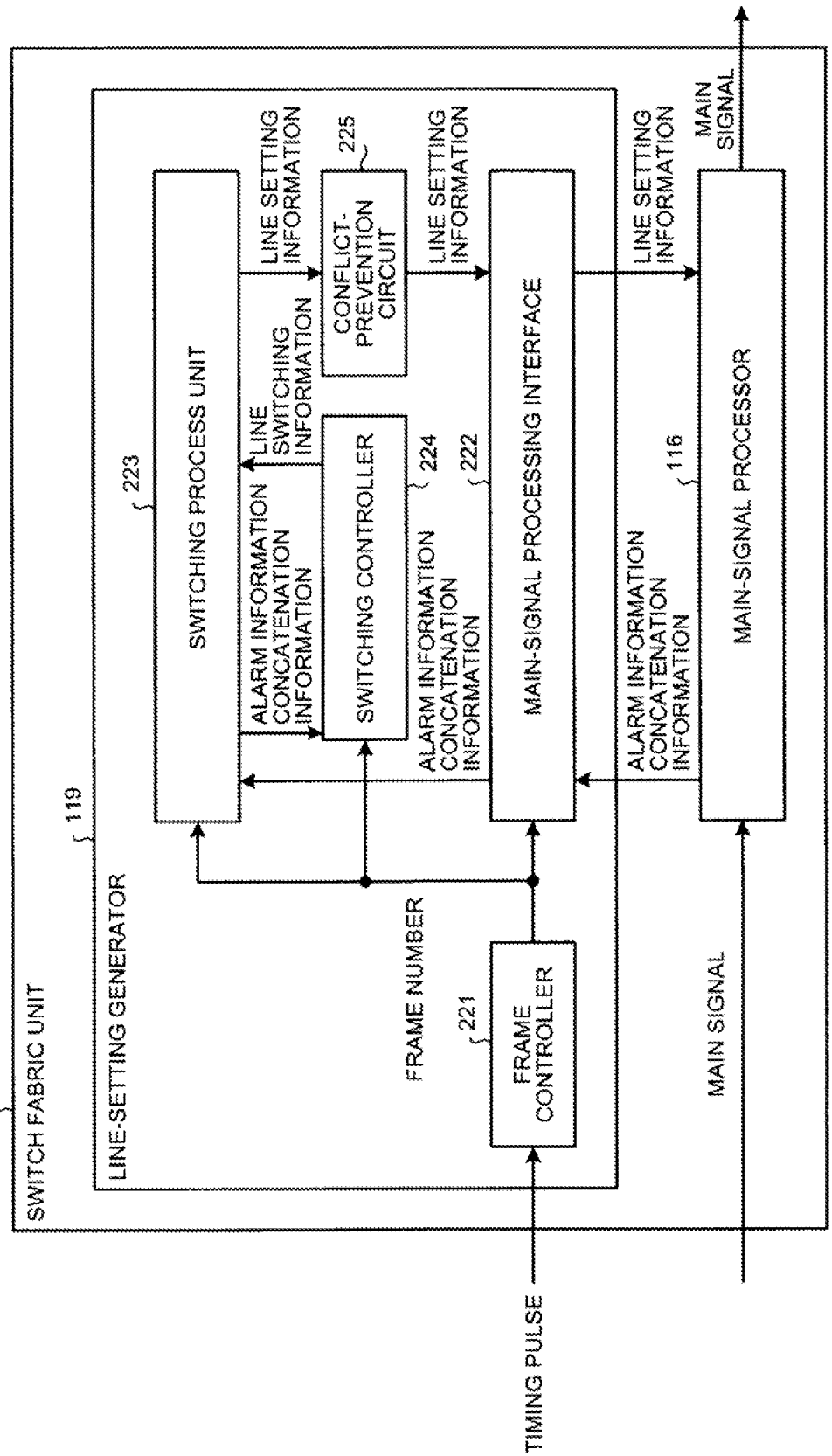

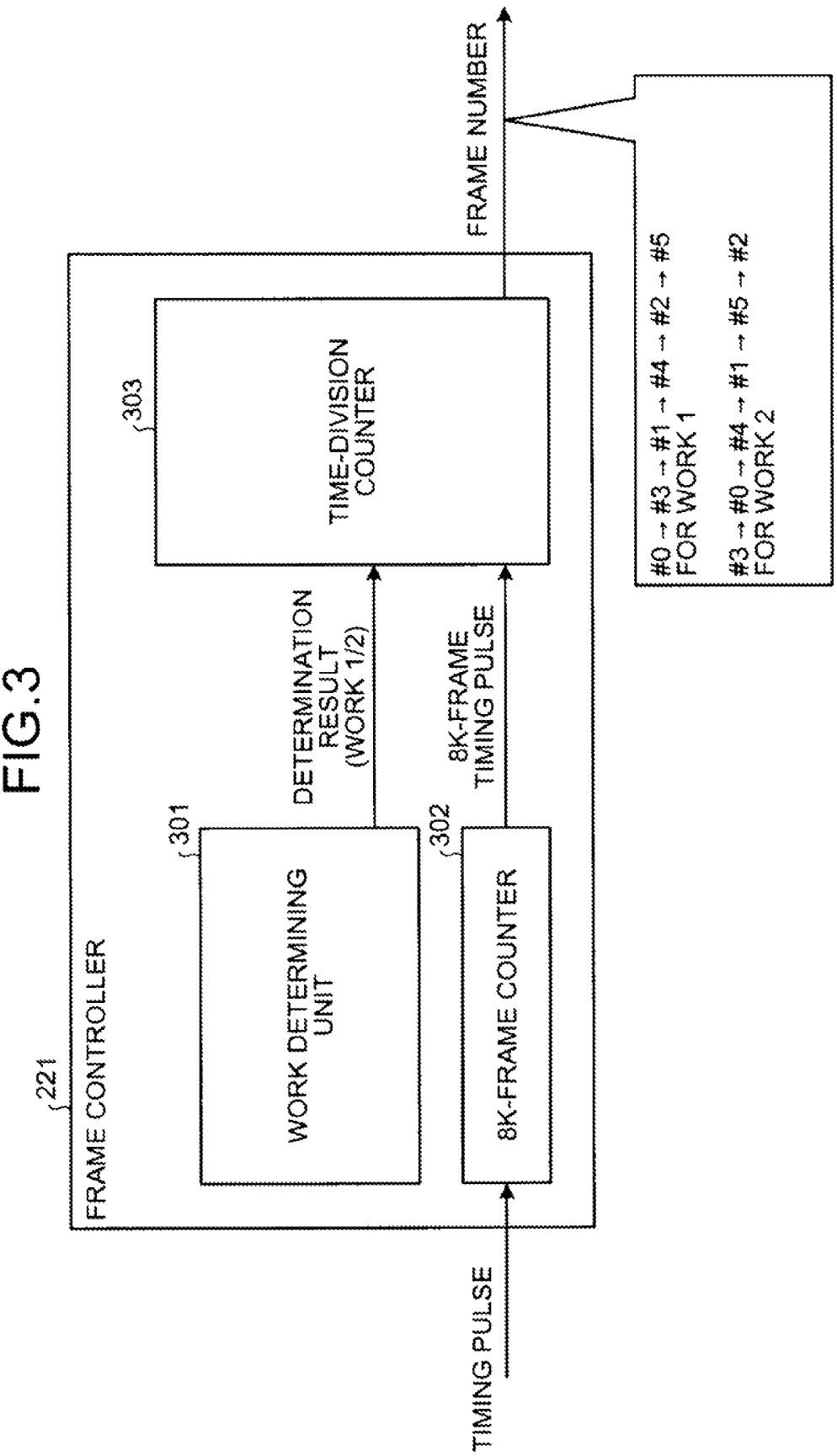

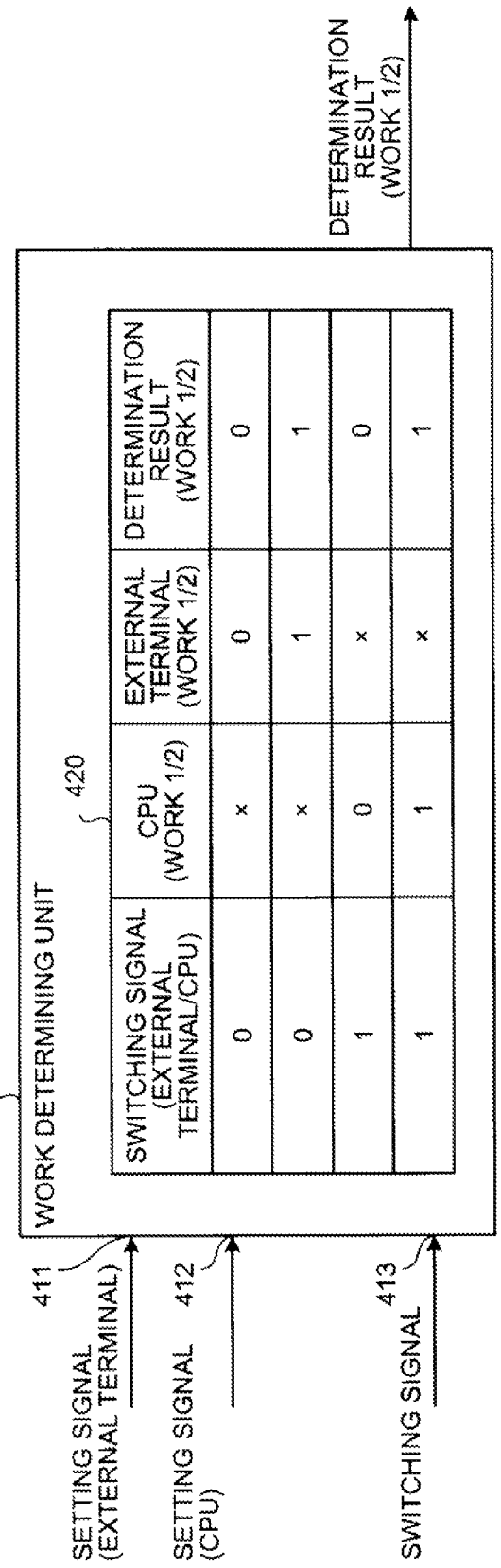

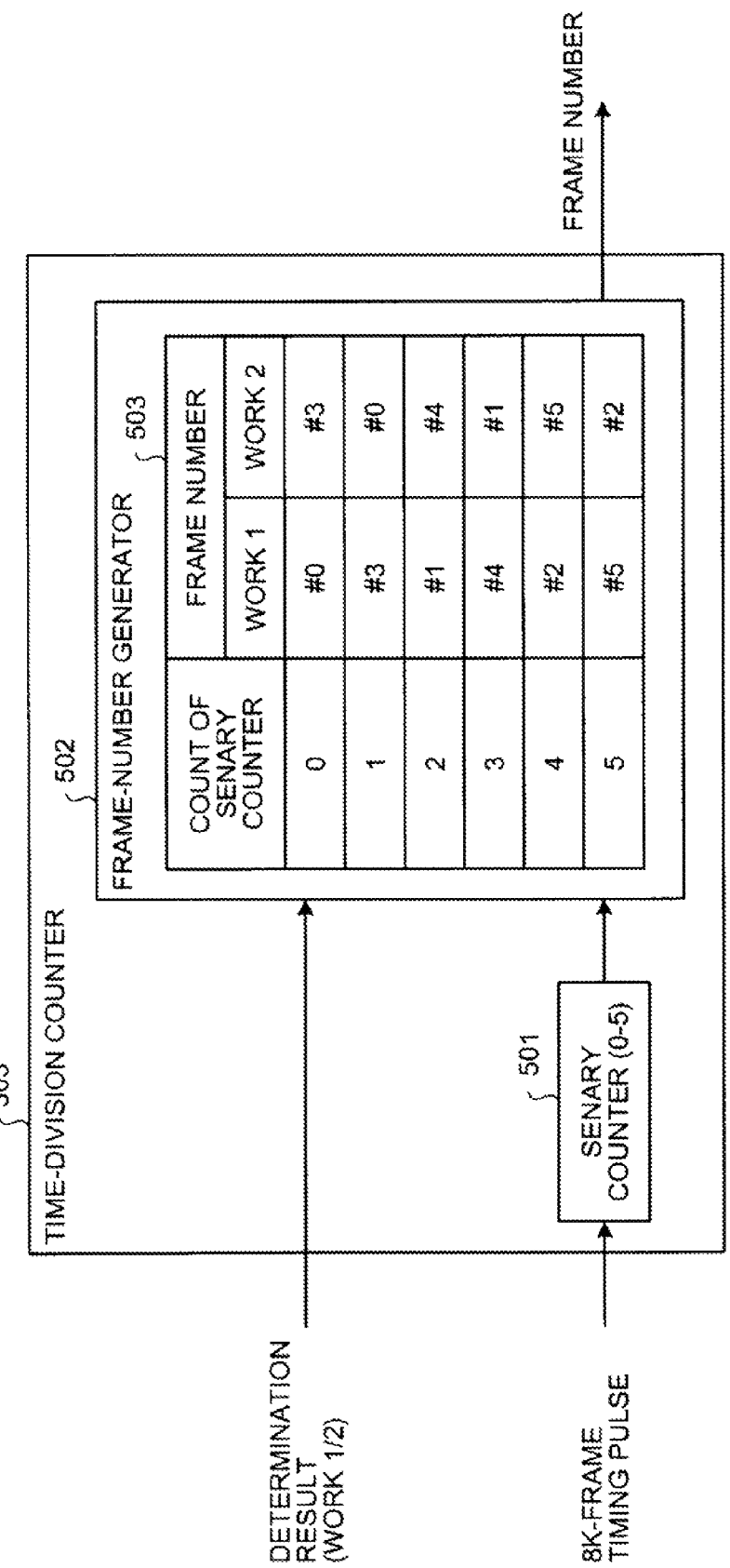

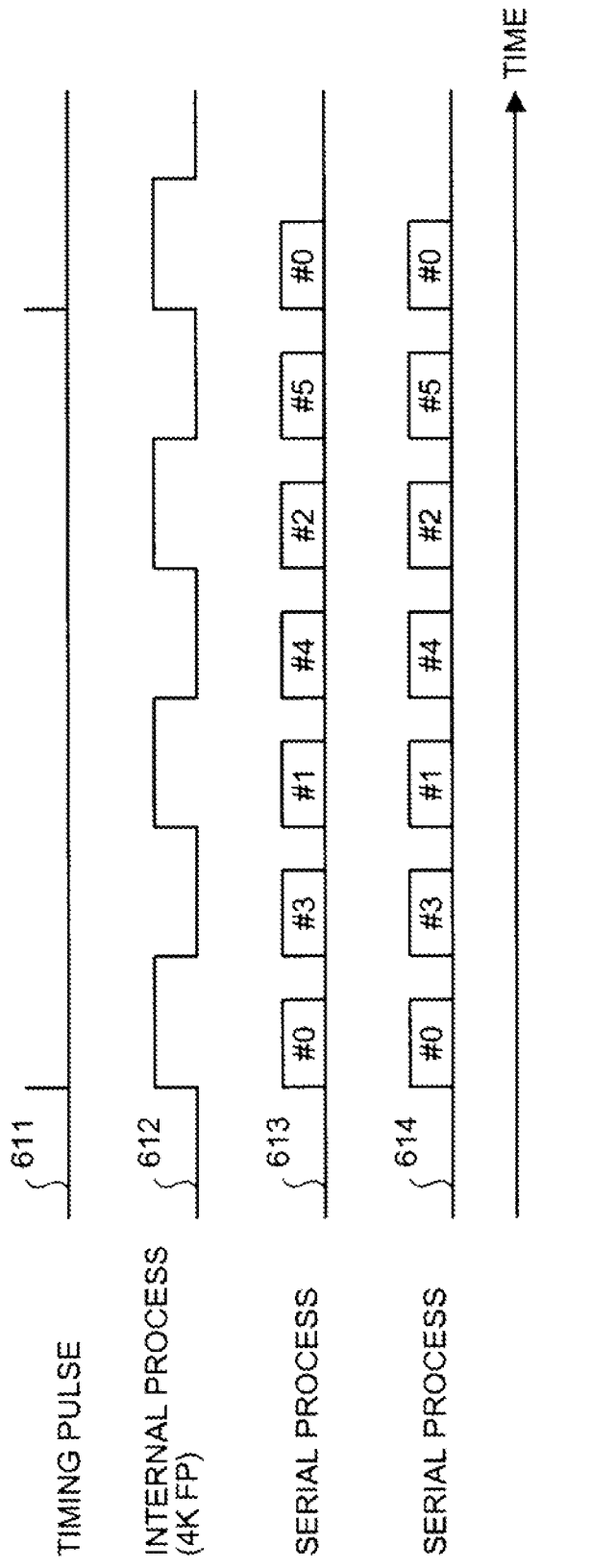

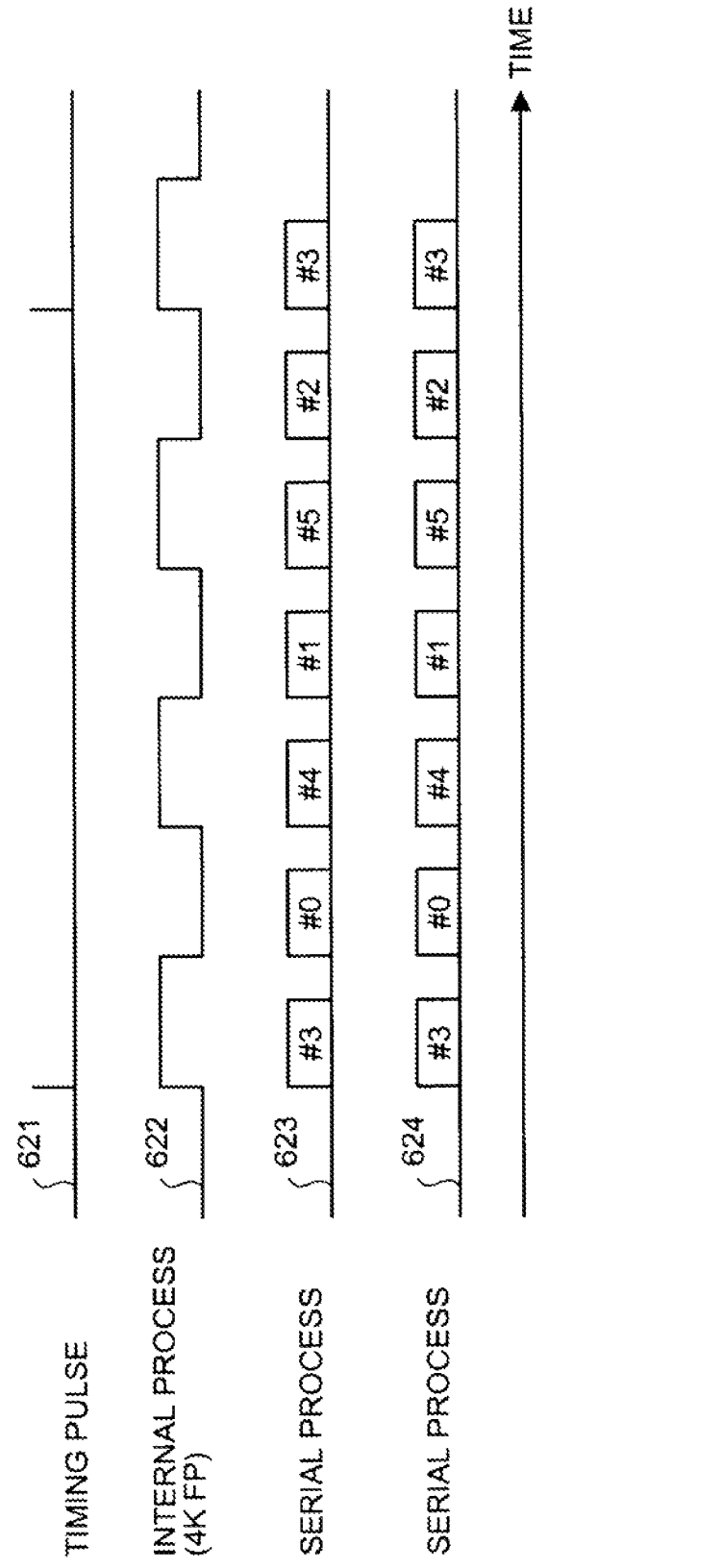

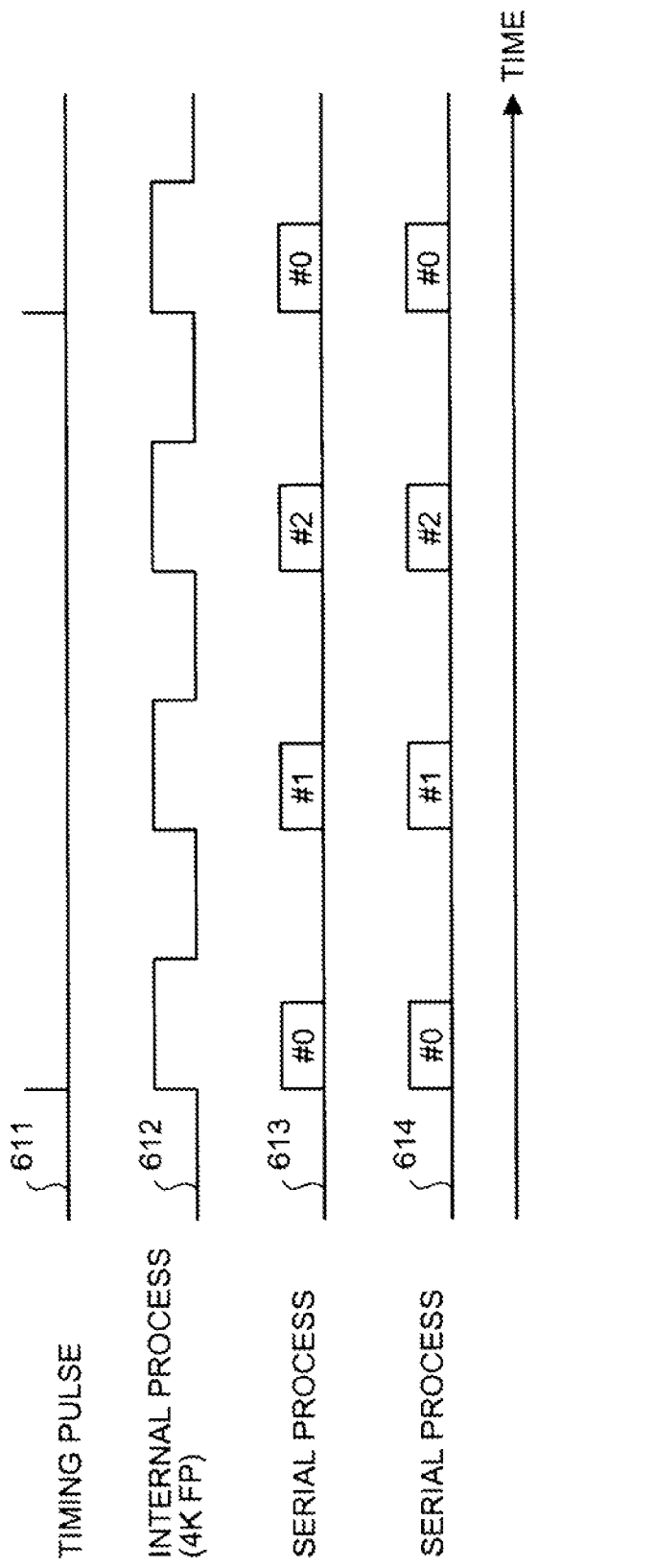

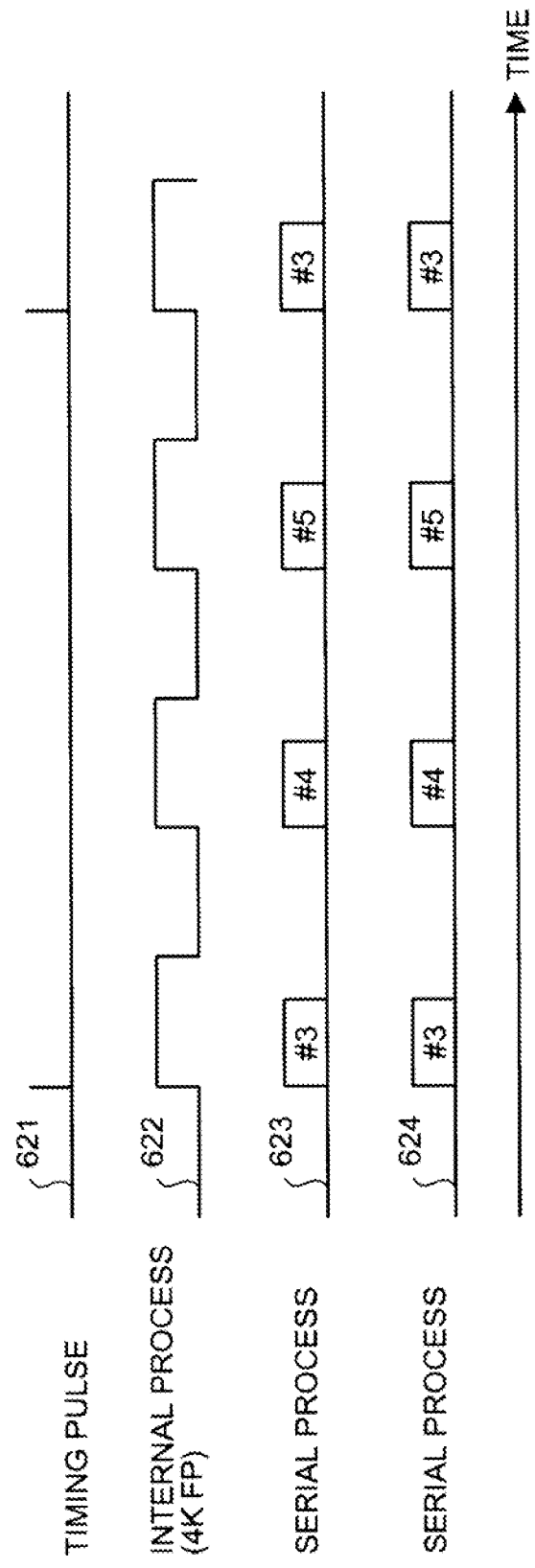

LINE SWITCHING DEVICE

CROSS REFERENCE TO RELATED APPLICATIONS

This application is based upon and claims the benefit of priority of the prior Japanese Patent Application No. 2011-225191, filed on Oct. 12, 2011, the entire contents of which are incorporated herein by reference.

FIELD

The embodiments discussed herein are related to a line switching device.

BACKGROUND

Due to the recent increase of transmission data, a high-speed and high-capacity transmission signal has been developed in the synchronous optical network (SONET) and the synchronous digital hierarchy (SDH). For example, time divisional processing and a virtual switch are under consideration as architecture for high-capacity data transmission (see, for example, Japanese Laid-Open Patent Publication No. 2008-306482). The architecture is applied to, for example, the multi service provisioning platform (MSPP).

In the conventional technology described above, however, lines cannot be arbitrarily switched if multiple switch fabric units for line switching are used since inputs to/outputs from the switch fabric units are independent from each other.

SUMMARY

According to an aspect of an embodiment, a line switching device includes multiple input ports to which signals are input and that include first input ports and second input ports different from the first input ports; multiple output ports that include given output ports; a branch unit that branches first signals input from the first input ports; and a switch that selectively outputs, among second signals input from the second input ports and branched signals branched from the first signals by the branch unit, signals that are to be switched to an output port among the given ports.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram of an example of configuration of a line switching device according to an embodiment;

FIG. 1B is a diagram of a first variation of the line switching device according to the embodiment;

FIG. 1C is a diagram of a second variation of the line switching device according to the embodiment;

FIG. 2 is a diagram of an example of configuration of a switch fabric unit;

FIG. 3 is a diagram of an example of configuration of a frame controller;

FIG. 4 is a diagram of an example of configuration of a WORK determining unit;

FIG. 5 is a diagram of an example of configuration of a time-division counter;

FIG. 6A is a diagram of an example of timings of processes up to cross connect in WORK 1;

FIG. 6B is a diagram of an example of timings of processes up to cross connect in WORK 2;

FIG. 7A is a diagram of an example of timings of processes after the cross connect in WORK 1;

FIG. 7B is a diagram of an example of timings of processes after the cross connect in WORK 2;

DESCRIPTION OF EMBODIMENTS

Figure 8:
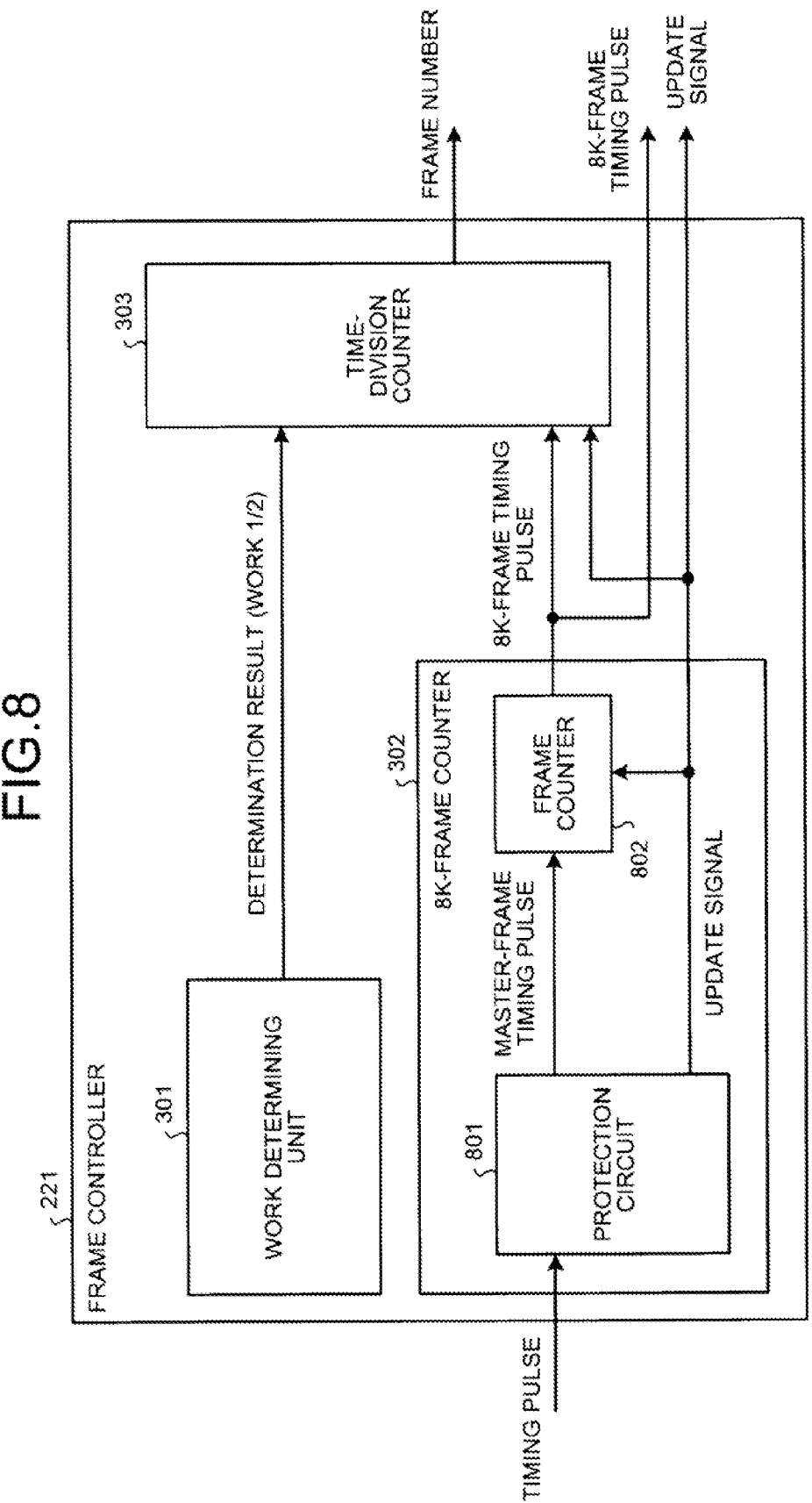
FIG. 8 is a diagram of an example of a specific configuration of the frame controller.

Preferred embodiments of the present invention will be explained with reference to the accompanying drawings.

Embodiments of a line switching device according to the present invention are described in detail below with reference to the accompanying drawings.

FIG. 1A is a diagram of an example of configuration of a line switching device according to an embodiment. A line switching device 100 depicted in FIG. 1A switches logical paths of OTN/SONET, for example. In the following description, SONET is taken as an example of a communications system to which the line switching device 100 is applied; however, the line switching device 100 may be applied to another communications system such as OTN (ODU).

As depicted in FIG. 1A, the line switching device 100 includes switching devices 110A and 110B each of which includes an interface unit 111, a branch unit 112, a multiplexer 113, a demultiplexer 114, and a switch fabric unit 115. Thus, the line switching device 100 includes multiple switch fabric units 115.

A configuration of the switching device 110A is described first. The interface unit 111 of the switching device 110A terminates a network such as OTN/SONET, and includes multiple interfaces (ports) each of which is connected to a line.

For example, the interface unit 111 includes input ports in#1 to in#24 (first input ports) and output ports out#1 to out#24 (first output ports). Signals from the network (first signals) are input into the input ports in#1 to in#24 that output the signals to the branch unit 112. The output ports out#1 to out#24 output signals from the switch fabric unit 115 to the network, respectively.

The interface unit 111 may detect, from the signals input into the input ports in#1 to in#24, alarm information and concatenation information of main signals to be transmitted and may store the alarm information and the concatenation information into the overheads of the signals (main signals) output from the input ports in#1 to in#24. The alarm information indicates an occurrence of a failure on a transmission path, for example. The concatenation information indicates a configuration (concatenation) of a main signal, for example.

The branch unit 112 outputs the signals from the input ports in#1 to in#24 to the switch fabric unit 115, and also branches the signals from the input ports in#1 to in#24 and outputs branched signals to the multiplexer 113.

The multiplexer 113 multiplexes the branched signals from the branch unit 112 and outputs the multiplexed signal to the switching device 110B. For example, the multiplexer 113 converts each of the branched signals from the branch unit 112 into an optical signal, and outputs a wavelength-multiplexed light of the optical signals to the switching device 110B through an optical fiber, for example. Thus, the signals input into the interface unit 111 of the switching device 110A can be output not only to the switch fabric unit 115 of the switching device 110A, but also to the switching device 110B.

The demultiplexer 114 demultiplexes a wavelength-multiplexed light of branched signals output from the switching device 110B, and outputs the branched signals to the switch fabric unit 115. For example, the demultiplexer 114 demultiplexes the wavelength-multiplexed light from the switching device 110B into optical signals, converts the optical signals into electric signals, and outputs the electric signals to the switch fabric unit 115. Thus, the signals input into the interface unit 111 of the switching device 110B can be input not only to the switch fabric unit 115 of the switching device 110B, but also to the switching device 110A.

The signals from the branch unit 112 and the branched signals from the demultiplexer 114 are input into the switch fabric unit 115 of the switching device 110A. The switch fabric unit 115 is a first switch that selectively outputs among the input signals, each signal that is to be switched to an output port among the output ports out#1 to out#24.

For example, the switch fabric unit 115 includes a main-signal processor 116 that includes a selector 117 (SEL) and a switch 118 (SW), and a line-setting generator 119.

The signals from the branch unit 112 and the branched signals from the demultiplexer 114 are input into the selector 117 that outputs to the line-setting generator 119, information that is based on the input signals such as the alarm information and the concatenation information stored in the overheads of the input signals.

The selector 117 selects and outputs to the switch 118, among the input signals and according to line setting information output from the line-setting generator 119, each signal that is to be switched to an output port among the output ports out#1 to out#24. For example, the selector 117 has 48 inputs and 24 outputs.

The switch 118 outputs, according to the line setting information output from the line-setting generator 119, the signals from the selector 117 to the destination output ports among the output ports out#1 to out#24. For example, the switch 118 has 24 inputs and 24 outputs.

A configuration of the switching device 110B is described next. The configuration of the switching device 110B is the same as that of the switching device 110A, for example, except that the interface unit 111 of the switching device 110B includes input ports in#25 to in#48 (second input ports) and output ports out#25 to out#48 (second output ports, given output ports).

Signals from the network (second signals) are input into the input ports in#25 to in#48 that output the signals to the branch unit 112. The output ports out#25 to out#48 output signals from the switch fabric unit 115 to the network, respectively.

The multiplexer 113 of the switching device 110B multiplexes branched signals from the branch unit 112 and outputs the multiplexed signal to the switching device 110A. The demultiplexer 114 of the switching device 110B demultiplexes multiplexed branched signals from the switching device 110A, and outputs the branched signals to the switch fabric unit 115. The switch fabric unit 115 of the switching device 110B is a second switch that outputs, among the input signals, each signal that is to be switched to an output port among the output ports out#25 to out#48.

Thus, the signals input into the input ports in#1 to in#24 can be output not only from the output ports out#1 to out#24, but also from the output ports out#25 to out#48. Further, the signals input into the input ports in#25 to in#48 can be output not only from the output ports out#25 to out#48, but also from the output ports out#1 to out#24.

Thus, the line switching device 100 inputs each of the input signals into each of the switch fabric units 115. Each switch fabric unit 115 selects and outputs, among all of the input signals, only signals corresponding to output ports connected to thereto. Thus, lines can be arbitrarily switched even in a line switching device with multiple switch fabric units 115.

The line switching device 100 may have a multi-shelf configuration in which the switch fabric units 115 are attachable to/detachable from the switching devices 110A and 110B, respectively. For example, each of the switching devices 110A and 110B may include a connector for attaching/detaching the switch fabric unit 115 to/from the branch unit 112 and the demultiplexer 114. The branch unit 112, the demultiplexer 114, and the switch fabric unit 115 can be connected by backboard wiring (back wiring board (BWB)), for example.

In the above description, when the branched signals from the signals input into the switching device 110A are output to the switching device 110B, the branched signals are converted into the optical signals and multiplexed; however, the branched signals may be output as they are (as electric signals) to the switching device 110B, for example. In this case, the multiplexer 113 may be omitted. The same applies to the branched signals that are branched from the signals input into the switching device 110B and output to the switching device 110A.

FIG. 1B is a diagram of a first variation of the line switching device according to the embodiment. In FIG. 1B, components similar to those depicted in FIG. 1A are assigned the same signs, and description thereof is omitted. As depicted in FIG. 1B, the switching device 110A can be used without the switch fabric unit 115 thereof (see, for example, FIG. 1A).

In the configuration depicted in FIG. 1B, the signals input into the input ports in#1 to in#24 can be output not only from the output ports out#1 to out#24, but also from the output ports out#25 to out#48.

In the configuration depicted in FIG. 1B, the input ports in#25 to in#48 come into use by attaching the switch fabric unit 115 to the switching device 110A. Thus, the signals input into the input ports in#25 to in#48 can be output not only from the output ports out#25 to out#48, but also from the output ports out#1 to out#24. Further, output ports can be easily increased/decreased by attaching/detaching the switch fabric unit 115.

Thus, according to the line switching device 100 of the embodiment, lines can be arbitrarily switched even in a line switching device that can use multiple switch fabric units 115.

FIG. 1C is a diagram of a second variation of the line switching device according to the embodiment. In FIG. 1C, components similar to those depicted in FIG. 1A are assigned the same signs, and description thereof is omitted. As depicted in FIG. 1C, the line switching device 100 may include a synchronizing unit 130 in addition to the components depicted in FIG. 1A. The synchronizing unit 130 outputs timing pulses indicating periodic timings to the interface units 111 and the switch fabric units 115 of the switching devices 110A and 110B.

The interface units 111 of the switching devices 110A and 110B perform transmission processes on each channel in synchronization with the timing pulses output from the synchronizing unit 130. The switch fabric units 115 of the switching devices 110A and 110B perform line setting processes in synchronization with the timing pulses output from the synchronizing unit 130.

Thus, the line setting processes performed by the switch fabric units 115 of the switching devices 110A and 110B can be synchronized. Further, the line setting processes performed by the switch fabric units 115 of the switching devices 110A and 110B and the transmission processes performed by the interface units 111 of the switching devices 110A and 110B can be synchronized. In the following, the line switching device 100 depicted in FIG. 1C is mainly described.

FIG. 2 is a diagram of an example of configuration of the switch fabric unit. In FIG. 2, components similar to those depicted in FIG. 1A are assigned the same signs, and description thereof is omitted. The switch fabric units 115 of the switching devices 110A and 110B implement protection switches by switching line setting information.

A main-signal processor 116 is a time slot interchange (TSI) with a cross-connect function. Main signals from the branch unit 112 and the demultiplexer 114 are input into the main-signal processor 116 that performs line setting by outputting the main signals to the interface unit 111 with time slots thereof being interchanged based on the line setting information output from the line-setting generator 119.

As described above, the alarm information and the concatenation information detected by the interface unit 111 are stored in the overheads of the main signals from the interface unit 111. The main-signal processor 116 extracts and outputs the alarm information and the concatenation information to the line-setting generator 119.

The line-setting generator 119 generates line setting information (result of selection of the interfaces) for controlling the line setting performed by the main-signal processor 116. The line-setting generator 119 also has functions as a write unit that writes the generated line setting information into a memory and a read unit that reads the line setting information written into the memory. For example, the line-setting generator 119 includes a frame controller 221, a main-signal processing interface 222, a switching process unit 223, a switching controller 224, and a conflict-prevention circuit 225.

The timing pulses from the synchronizing unit 130 (see, for example, FIG. 1C) are input into the frame controller 221 that generates, in synchronization with the timing pulse, the frame number indicating a frame of the main signal to be subjected to time divisional processing performed by the line-setting generator 119 (see, for example, FIG. 3). The frame controller 221 outputs the generated frame number to the main-signal processing interface 222, the switching process unit 223, and the switching controller 224.

In synchronization with the frame numbers output from the frame controller 221, the main-signal processing interface 222 outputs to the switching process unit 223, the alarm information and the concatenation information output from the main-signal processor 116, and also outputs to the main-signal processor 116, the line setting information output from the conflict-prevention circuit 225.

In synchronization with the frame numbers output from the frame controller 221, the switching process unit 223 outputs to the switching controller 224, the alarm information and the concatenation information output from the main-signal processing interface 222. The switching process unit 223 generates the line setting information based on setting information from an external device (e.g., a device for maintenance) and line switching information from the switching controller 224, and outputs the line setting information to the conflict-prevention circuit 225.

The switching controller 224 is a controller for a network application such as bi-directional line switched ring (BLSR), cross connect, and service selector (SS). The switching controller 224 determines, in synchronization with the frame numbers output from the frame controller 221, line switching for the network application based on the alarm information and the concatenation information output from the switching process unit 223, and outputs the line switching information indicating the result of the determination on the line switching to the switching process unit 223.

Figure 9:
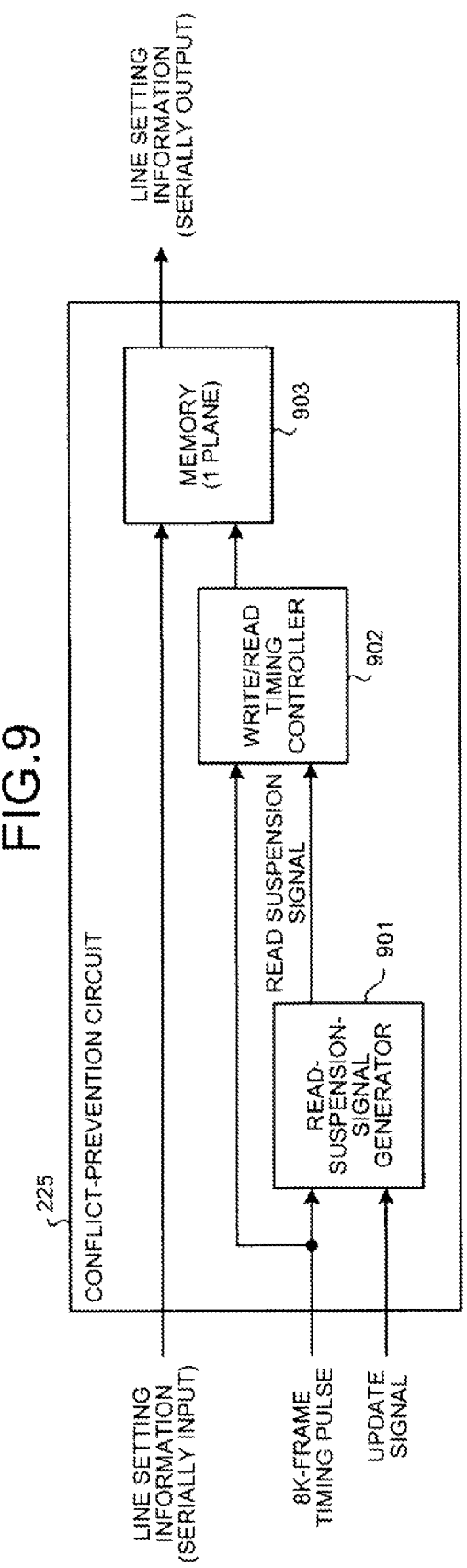
FIG. 9 is a diagram of an example of configuration of a conflict-prevention circuit.

The conflict-prevention circuit 225 outputs the line setting information from the switching process unit 223 to the main-signal processing interface 222 such that memory conflict of the line setting information (for example, conflict between a write process to and a read process from the memory) is prevented (see, for example, FIG. 9).

The main-signal processor 116 and the line-setting generator 119 can be implemented by an electronic circuit such as an application specific integrated circuit (ASIC).

FIG. 3 is a diagram of an example of configuration of the frame controller. The frame controller 221 depicted in FIG. 2 includes, for example, a WORK determining unit 301, an 8K-frame counter 302, and a time-division counter 303 as depicted in FIG. 3.

The WORK determining unit 301 determines whether the parent unit (the switch fabric unit to which the WORK determining unit 301 belongs) is either WORK 1 or WORK 2 based on, for example, information input from an external terminal and/or setting information from a central processing unit (CPU) (see, for example, FIG. 4). The WORK determining unit 301 outputs the result of the determination to the time-division counter 303.

The timing pulses output from the synchronizing unit 130 are input into the 8K-frame counter 302 that obtains the timings of 8K frames by counting the timing pulses, and outputs 8K-frame timing pulses indicating the obtained timings to the time-division counter 303.

For each of the timings indicated by the 8K-frame timing pulses output from the 8K-frame counter 302, the time-division counter 303 outputs a frame number (e.g., #0 to #5) indicating the number of a frame to be processed by the parent unit. The time-division counter 303 outputs a given frame number at different timings according to whether the parent unit is WORK 1 or WORK 2, based on the result of the determination output from the WORK determining unit 301.

For example, the time-division counter 303 outputs the frame number in the order of #0→#3→#1→#4→#2→#5 if the parent unit is WORK 1, while outputs the frame number in the order of #3→#0→#4→#1→#5→#2 if the parent unit is WORK 2.

Since the timing of time divisional processing is different between the switch fabric units of WORK 1 and WORK 2 as described above, memory conflict that can occur in time-divisional serial processes can be prevented, thereby achieving distributed line setting by multiple switch fabric units and a high-capacity line switching device 100.

FIG. 4 is a diagram of an example of configuration of the WORK determining unit. The WORK determining unit 301 depicted in FIG. 3 includes, for example, input units 411 to 413 as depicted in FIG. 4. "0" or "1" is input into the input unit 411 as a setting signal from the external terminal of the switch fabric unit 115. The setting signal "0" input into the input unit 411 indicates that the parent unit is supposed to operate as WORK 1, while "1" indicates that the parent unit is supposed to operate as WORK 2.

The setting information from the CPU of the line switching device 100 is input into the input unit 412. The setting information "0" input into the input unit 412 indicates that the parent unit is supposed to operate as WORK 1, while "1" indicates that the parent unit is supposed to operate as WORK 2.

A switching signal from the external terminal or the CPU is input into the input unit 413. The switching signal "0" input into the input unit 413 indicates that whether the parent unit is WORK 1 or WORK 2 is to be determined based on the setting signal input into the input unit 411, while the switching signal "1" indicates that whether the parent unit is WORK 1 or WORK 2 is to be determined based on the setting signal input into the input unit 412.

The outputs from the WORK determining unit 301 with respect to the inputs to the input units 411 to 413 are depicted in a truth table 420 in which the determination result "0" indicates that the parent unit is supposed to operate as WORK 1, while the determination result "1" indicates that the parent unit is supposed to operate as WORK 2. For example, the WORK determining unit 301 outputs the determination result "0" indicating that the parent unit is supposed to operate as WORK 1 if the setting information "0" is input into the input unit 411 and the switching signal "0" is input into the input unit 413.

As described above, the WORK determining unit 301 has an identification flag indicating whether the parent unit is WORK 1 or WORK 2. For example, the switch fabric unit 115 of the switching device 110A is set to WORK 1, while the switch fabric unit 115 of the switching device 110B is set to WORK 2.

FIG. 5 is a diagram of an example of configuration of the time-division counter. The time-division counter 303 depicted in FIG. 3 includes, for example, a senary counter 501 and a frame-number generator 502 as depicted in FIG. 5. The senary counter 501 counts the 8K-frame timing pulses output from the 8K-frame counter 302 in senary, and outputs the count of the 8K-frame timing pulses (0, 1, 2, 3, 4, 5, 0, 1, . . . ) to the frame-number generator 502.

Each time the count output from the senary counter 501 is incremented, the frame-number generator 502 outputs a frame number indicating the number of a frame to be processed by the parent unit. As depicted in a table 503, the frame-number generator 502 stores therein #0, #3, #1, #4, #2, #5 associated with the counts 0 to 5 in senary, respectively, as frame numbers for WORK 1. The frame-number generator 502 also stores therein #3, #0, #4, #1, #5, #2 associated with the counts 0 to 5 in senary, respectively, as frame numbers for WORK 2.

The frame-number generator 502 outputs a frame number corresponding to the determination result of WORK 1/2 output from the WORK determining unit 301 and the count output from the senary counter 501. For example, the frame-number generator 502 outputs #0, #3, #1, #4, #2, #5 for the counts 0 to 5 output from the senary counter 501, respectively, if the parent unit is WORK 1. On the other hand, the frame-number generator 502 outputs #3, #0, #4, #1, #5, #2 for the counts 0 to 5 output from the senary counter 501, respectively, if the parent unit is WORK 2.

Thus, at each timing indicated by the 8K-frame timing pulse, the time-division counter 303 can output the frame number indicating the number of the frame to be processed by the parent unit in the order according to the operation state of the parent unit.

FIG. 6A is a diagram of an example of timings of processes up to cross connect in WORK 1. FIG. 6A depicts the timings of processes up to cross connect performed by the line-setting generator 119 of the switching device 110A of which operation state is set to WORK 1. The horizontal axis in FIG. 6A represents time.

Timing pulses 611 are the timing pulses output from the synchronizing unit 130. Frame pulses 612 are 4K-frame pulses (FP) and indicate the timings of an internal process performed by the line-setting generator 119 of the switching device 110A set to WORK 1.

Serial processes 613 and 614 represent line setting processes (serial processes) performed by the line-setting generator 119 of the switching device 110A set to WORK 1. For example, two processes are performed in parallel taking a capacity of 320 G as a unit of 1 frame, thereby achieving the total capacity of 2 T. As depicted in the serial processes 613 and 614, the line-setting generator 119 performs two serial processes in parallel. The clock cycle (timing pulse) of the line-setting generator 119 is 155.52 MHz.

The line-setting generator 119 of the switching device 110A processes frames #0 to #2 during the first-half 8K section (assert period) of the 4K frame of the frame pulse 612, and processes frames #3 to #5 during the latter-half 8K section (negate period) of the 4K frame of the frame pulse 612.

The line-setting generator 119 of the switching device 110A performs the processes up to the cross connect for each frame (all frames), thereby enabling a switching to any of the interfaces in the cross connect.

FIG. 6B is a diagram of an example of timings of processes up to cross connect in WORK 2. FIG. 6B depicts the timings of processes up to cross connect performed by the line-setting generator 119 of the switching device 110B of which operation state is set to WORK 2. The horizontal axis in FIG. 6B represents time.

Timing pulses 621 are the timing pulses output from the synchronizing unit 130. Frame pulses 622 are 4K-frame pulses and indicate the timings of an internal process performed by the line-setting generator 119 of the switching device 110B set to WORK 2.

Serial processes 623 and 624 represent line setting processes (serial processes) performed by the line-setting generator 119 of the switching device 110B set to WORK 2. For example, two processes are performed in parallel taking a capacity of 320 G as a unit of 1 frame, thereby achieving the total capacity of 2 T. As depicted in the serial processes 623 and 624, the line-setting generator 119 performs two serial processes in parallel. The clock cycle (timing pulse) of the line-setting generator 119 is 155.52 MHz.

The line-setting generator 119 of the switching device 110B processes frames #3 to #5 during the first-half 8K section (assert period) of the 4K frame of the frame pulse 622, and processes frames #0 to #2 during the latter-half 8K section (negate period) of the 4K frame of the frame pulse 622.

The line-setting generator 119 of the switching device 110B performs the processes up to the cross connect for each frame (all frames), thereby enabling a switching to any of the interfaces in the cross connect.

As depicted in FIGS. 6A and 6B, the timings of processes performed by the line-setting generators 119 can be matched by using the timing that is generated by the synchronizing unit 130 and has a cycle of multi frames (time divisional process×3 frames). The cycle of the timing pulses in this case is, for example, 4K/3 frame=1.33 . . . KHz (750 us).

FIG. 7A is a diagram of an example of timings of processes after the cross connect in WORK 1. In FIG. 7A, portions similar to those depicted in FIG. 6A are assigned the same signs, and description thereof is omitted. In the processes after the cross connect (given processes based on the result of the cross connect), the line-setting generator 119 of the switching device 110A (WORK 1) processes frames #0 to #2 among frames #0 to #5, and does not process frames #3 to #5. Thus, memory conflict between the process for frames #3 to #5 performed by the line-setting generator 119 and the process at the output side of the main-signal processing interface 222 can be prevented.

FIG. 7B is a diagram of an example of timings of processes after the cross connect in WORK 2. In FIG. 7B, portions similar to those depicted in FIG. 6B are assigned the same signs, and description thereof is omitted. In the processes after the cross connect (given processes based on the result of the cross connect), the line-setting generator 119 of the switching device 110B (WORK 2) processes frames #3 to #5 among frames #0 to #5, and does not process frames #0 to #2. Thus, memory conflict between the process for frames #0 to #2 performed by the line-setting generator 119 and the process at the output side of the main-signal processing interface 222 can be prevented.

As depicted in FIGS. 7A and 7B, in the processes after the cross connect, the line switching device 100 processes frames #0 to #2 by the switch fabric unit 115 of the switching device 110A, and processes frames #3 to #5 by the switch fabric unit 115 of the switching device 110B. Thus, the processes after the cross connect can be distributed to the switch fabric units 115 of the switching devices 110A and 110B.

FIG. 8 is a diagram of an example of a specific configuration of the frame controller. In FIG. 8, components similar to those depicted in FIG. 3 are assigned the same sings, and description thereof is omitted. As depicted in FIG. 8, the 8K-frame counter 302 of the frame controller 221 includes a protection circuit 801 and a frame counter 802.

The timing pulses output from the synchronizing unit 130 are input into the protection circuit 801 that generates and outputs master-frame timing pulses to the frame counter 802. The protection circuit 801 synchronizes the master-frame timing pulses to be output with the input timing pulses.

The protection circuit 801 synchronizes the master-frame timing pulses with the timing pulses again when the timings indicated by the timing pulses change due to disturbance. In this case, the protection circuit 801 outputs an update signal indicating that the timings of the master-frame timing pulses have been updated. Thus, the update signal is a signal drawn to a new phase when the timing pulses are disturbed. The update signal from the protection circuit 801 is output to the frame counter 802, the time-division counter 303, and the conflict-prevention circuit 225 (see, for example, FIG. 2).

The frame counter 802 detects the timings of 8K-frames based on the master-frame timing pulses output from the protection circuit 801, and outputs 8K-frame timing pulses indicating the detected timings of 8K-frames. The 8K-frame timing pulses from the frame counter 802 are output to the time-division counter 303 and the conflict-prevention circuit 225 (see, for example, FIG. 2).

When the update signal is output from the protection circuit 801, the frame counter 802 detects the timings of 8K-frames again based on the master-frame timing pulses output from the protection circuit 801, and updates the timings of 8K-frame timing pulses.

When the update signal is output from the protection circuit 801, the time-division counter 303 suspends the update of the frame number until completion of the transmission of the line setting information, and initializes the frame number. For example, the senary counter 501 of the time-division counter 303 (see, for example, FIG. 5) initializes the count (makes the count 0) when the update signal is output from the protection circuit 801, thereby initializing the frame number output from the time-division counter 303.

FIG. 9 is a diagram of an example of configuration of the conflict-prevention circuit. The conflict-prevention circuit 225 depicted in FIG. 2 includes, for example, a read-suspension-signal generator 901, a write/read timing controller 902, and a memory 903 as depicted in FIG. 9. The memory 903 may be a memory of the main-signal processing interface 222.

The update signal and the 8K-frame timing pulses from the frame controller 221 are input into the read-suspension-signal generator 901 that outputs, upon the input of the update signal, a read suspension signal instructing suspension of a read process from the memory 903 to the write/read timing controller 902.

The 8K-frame timing pulses from the frame controller 221 and the read suspension signal from the read-suspension-signal generator 901 are input into the write/read timing controller 902 that controls the timing of a write process/a read process of the line setting information to/from the memory 903 based on the input 8K-frame timing pulses. Upon the input of the read suspension signal, the write/read timing controller 902 suspends a read process of the line setting information from the memory 903.

The memory 903 is a memory having one plane and storing the line setting information. At the timings controlled by the write/read timing controller 902, the memory 903 stores therein the line setting information serially input from the switching process unit 223 (write process), and serially outputs the stored line setting information to the main-signal processing interface 222 (read process).

Thus, conflict between the write process of the line setting information to the memory 903 and the read process of the line setting information from the memory 903 can be prevented even when the memory 903 storing the line setting information includes only one plane.

Figure 10:
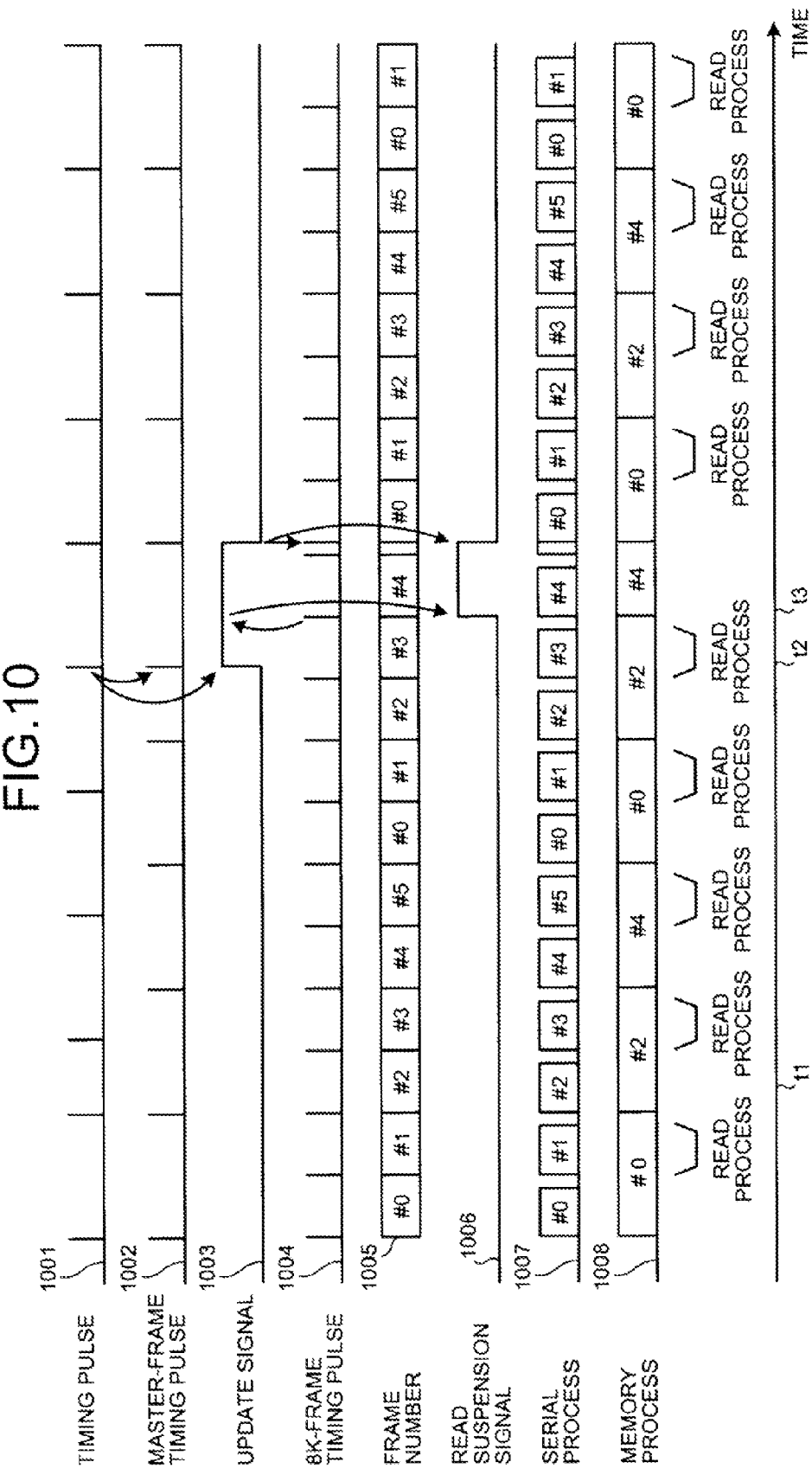
FIG. 10 is a diagram of an example of the time chart of signals.

FIG. 10 is a diagram of an example of the time chart of signals. The horizontal axis of FIG. 10 represents time. Timing pulses 1001 are the timing pulses input from the synchronizing unit 130 to the 8K-frame counter 302. In the example depicted in FIG. 10, it is assumed that the timing pulses 1001 are disturbed at time t1 due to, for example, attachment/detachment of the switch fabric unit 115 to/from the switching device 110A or 110B.

Master-frame timing pulses 1002 are the master-frame timing pulses output from the protection circuit 801 that synchronizes the master-frame timing pulses 1002 with the timing pulses 1001. In the example depicted in FIG. 10, it is assumed that the protection circuit 801 synchronizes the master-frame timing pulses 1002 with the timing pulses 1001 at the 4th timing pulse 1001 (at time t2) from time t1 at which the timing pulses 1001 are disturbed.

An update signal 1003 is the update signal output from the protection circuit 801 that asserts the update signal 1003 for only one cycle of the master-frame timing pulse 1002 at the timing at which the master-frame timing pulses 1002 are synchronized with the timing pulses 1001 after the timing pulses 1001 are disturbed at time t1.

8K-frame timing pulses 1004 are the 8K-frame timing pulses output from the 8K-frame counter 302 that obtains the timings of 8K frames based on the master-frame timing pulses 1002 output from the protection circuit 801, and outputs the timings as the 8K-frame timing pulses 1004. The 8K-frame counter 302 also obtains the timings of 8K frames again based on the master-frame timing pulses 1002 and updates the timings of 8K-frame timing pulses 1004 when the update signal 1003 is asserted.

Frame numbers 1005 are the frame numbers output from the frame-number generator 502. The frame-number generator 502 outputs the frame numbers 1005 in synchronization with the 8K-frame timing pulses 1004. The frame-number generator 502 also initializes the frame number 1005 to #0 and synchronizes the frame numbers 1005 with the 8K-frame timing pulses 1004 again when the update signal 1003 is asserted and then negated.

A read suspension signal 1006 is the read suspension signal output from the read-suspension-signal generator 901 that asserts, when the update signal 1003 is asserted, the read suspension signal 1006 at the next timing of the 8K-frame timing pulse 1004 (at time t3). The read-suspension-signal generator 901 negates the read suspension signal 1006 when the update signal 1003 is negated.

A serial process 1007 represents the serial process for line setting performed by the switching process unit 223, the switching controller 224, and the conflict-prevention circuit 225. As depicted in the serial process 1007, the switching process unit 223, the switching controller 224, and the conflict-prevention circuit 225 serially process the frames indicated by the frame numbers 1005 in synchronization with the frame numbers 1005.

Memory processes 1008 represent processes with respect to the memory 903 controlled by the write/read timing controller 902. As depicted in the memory processes 1008, line setting information of frames #0, #2, and #4 is written into the memory 903 at the timings at which frames #0, #2, and #4 are processed in the serial process 1007, and is read from the memory 903 at the timings at which frames #1, #3, and #5 are processed in the serial process 1007. Thus, conflict between the write process and the read process of the line setting information can be prevented from occurring in the memory 903.

Figure 11:
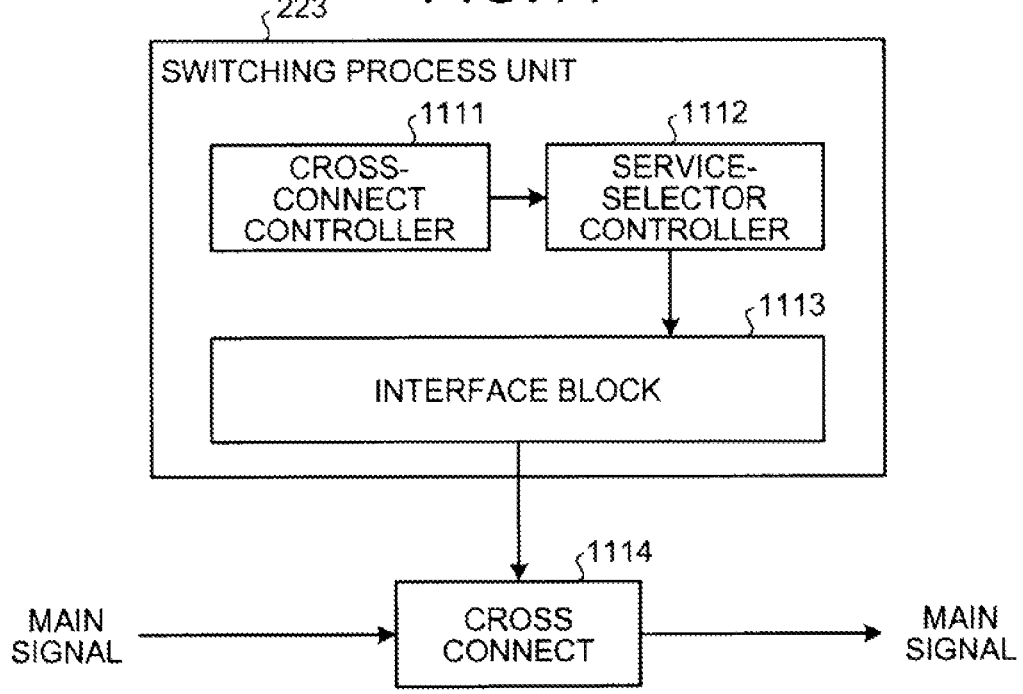
FIG. 11 is a diagram of an example of a part of processes performed by a switching process unit.

FIG. 11 is a diagram of an example of a part of processes performed by the switching process unit. A cross connect 1114 depicted in FIG. 11 is a cross connect included in the main-signal processor 116, and performs line setting for the input main signals and outputs the main signals downstream. The line setting by the cross connect 1114 includes, for example, cross connect for line switching and a service selector for selectively outputting add signals or through signals.

The switching process unit 223 depicted in FIG. 2 includes, for example, a cross-connect controller 1111 and a service-selector controller 1112 as depicted in FIG. 11. The cross-connect controller 1111 determines, for each channel, the destination line (the destination to which the channel is switched) for the cross connect 1114 based on the alarm information. The service-selector controller 1112 determines the main signal (add signal or through signal) selected by the service selector implemented by the cross connect 1114 based on the result of the determination on the destination line by the cross connect 1114.

Line setting information indicating the result of the determination by the cross-connect controller 1111 and the service-selector controller 1112 is input into the cross connect 1114 via an interface block 1113. The processes after the cross connect described above are performed by, for example, the service selector. For example, the interface block 1113 may be the main-signal processing interface 222 depicted in FIG. 2.

Here, cross connect and service selector have been described as the line setting by the cross connect 1114; however, the line setting by the cross connect 1114 is not limited to this. For example, a 1+1 switch, a 1:N switch, an unidirectional path switched ring (UPSR), and BLSR can be applied to the cross connect 1114. BLSR includes, for example, ring switching such as dual transmit on protection (DTP) of SONET and non-preemptible unprotected traffic (NUT), and shared protection ring of OTN.

Figure 12:
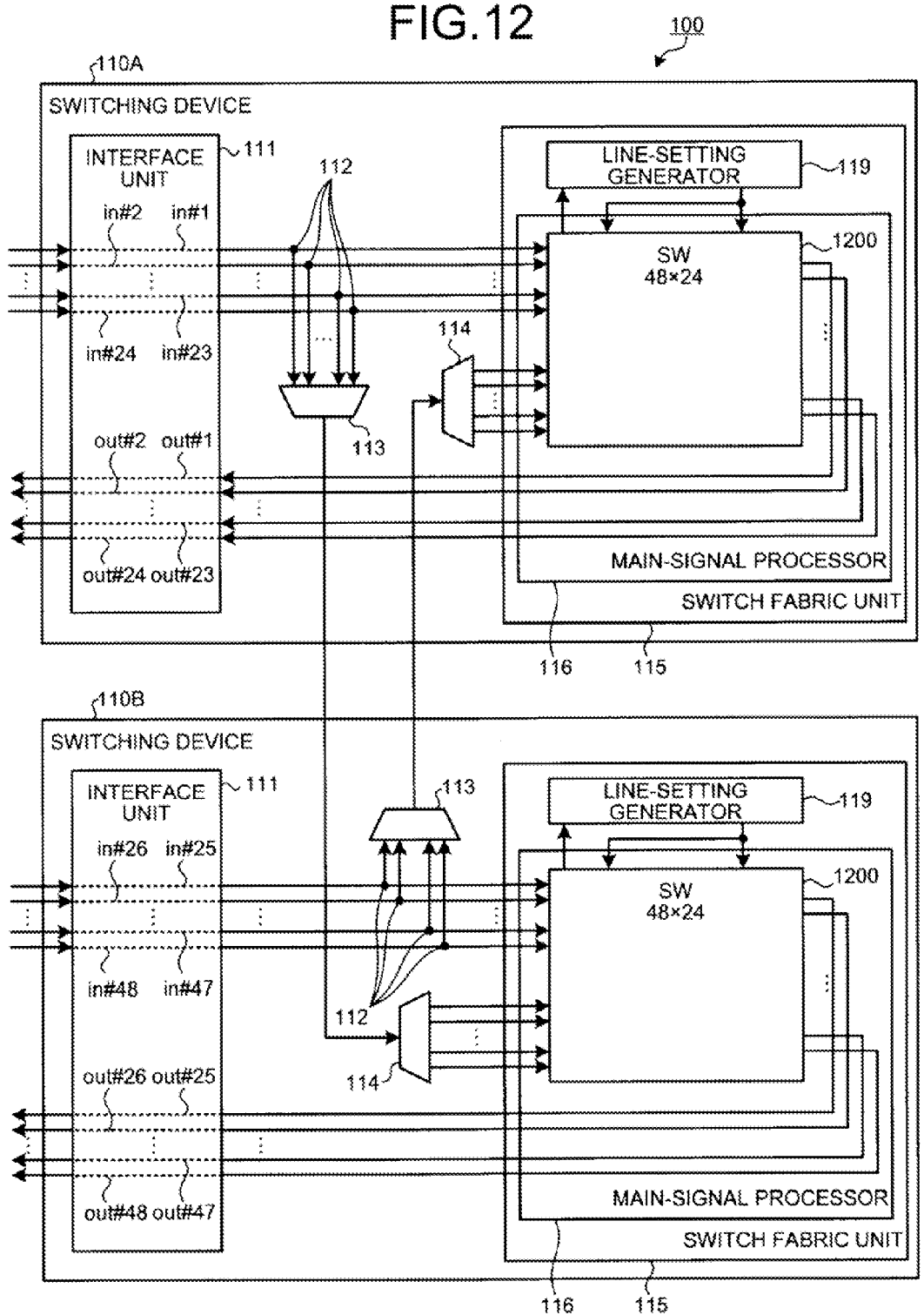
FIG. 12 is diagram of a third variation of the line switching device according to the embodiment.

FIG. 12 is a diagram of a third variation of the line switching device according to the embodiment. In FIG. 12, components similar to those depicted in FIG. 1A are assigned the same signs, and description thereof is omitted. As depicted in FIG. 12, each of the switching devices 110A and 110B may include a switch 1200 (48×24) instead of the selector 117 and the switch 118 (see, for example, FIG. 1A). Although the switch 1200 of the switching device 110A is described herein, the switch 1200 of the switching device 110B is the same.

The switch 1200 has 48 inputs and 24 outputs, and outputs information based on the signals from the branch unit 112 and the demultiplexer 114 (such as the alarm information and the concatenation information) to the line-setting generator 119. The switch 1200 also outputs, based on the line setting information output from the line-setting generator 119, 24 signals of the input 48 signals to the destination output ports among the output ports out#1 to out#24.

Figure 13:
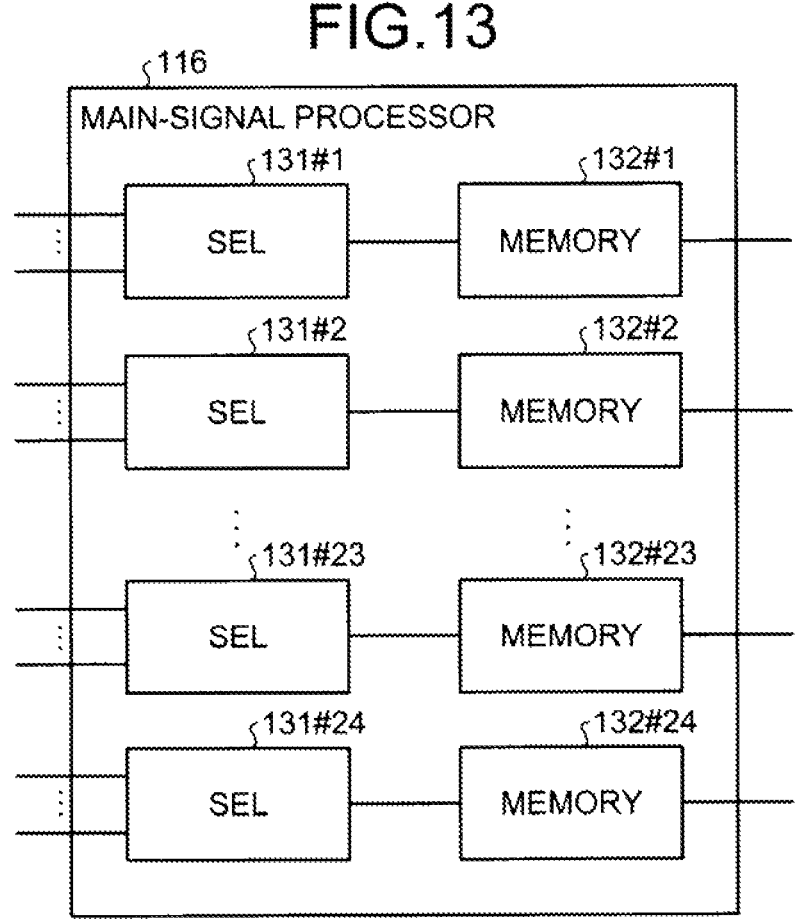
FIG. 13 is a diagram of a variation of a main-signal processor.

FIG. 13 is a diagram of a variation of the main-signal processor. As depicted in FIG. 13, the main-signal processor 116 may include selectors 131#1 to 131#24 and memories 132#1 to 132#24. Although the main-signal processor 116 of the switching device 110A is described herein, the main-signal processor 116 of the switching device 110B is the same. Each of the selectors 131#1 to 131#24 has 48 inputs and 1 output. 48 signals from the branch unit 112 and the demultiplexer 114 are input into each of the selectors 131#1 to 131#24.

Each of the selectors 131#1 to 131#24 outputs any of the input 48 signals according to the line setting information output from the line-setting generator 119, thereby selecting 24 signals from among 48 signals input into the main-signal processor 116.

Each of the memories 132#1 to 132#24 is a memory for time slot interchange. The memories 132#1 to 132#24 store the signals output from the selectors 131#1 to 131#24, respectively. The main-signal processor 116 reads a signal stored in any of the memories 132#1 to 132#24 at a time slot based on the line setting information output from the line-setting generator 119, and outputs the signal to an output port corresponding to the time slot among the output ports out#1 to out#24.

As described above, the line switching device 100 according to the embodiment inputs all input signals to each of the switch fabric units 115 each of which selectively outputs, among all of the input signals, only signals corresponding to output ports connected thereto. Thus, lines can be arbitrarily switched even in a line switching device with multiple switch fabric units 115.

Further, line switching by multiple switch fabric units 115 can increase inputs/outputs of OTN/SONET signal without increasing the scale of the switch fabric unit 115, thereby facilitating implementation on an existing device.

In contrast, to increase inputs/outputs of OTN/SONET signal in the conventional line switching device, the scale of the switch fabric unit increases due to increase of circuits of a switching unit and increase of memories corresponding to the switched input signals.

For example, 24 selectors with 24 inputs and 1 output and 24 memories are used to achieve the capacity of 24 inputs and 24 outputs by a switch fabric unit using selectors. On the other hand, for example, 48 selectors with 48 inputs and 1 output and 48 memories are used to achieve the capacity of 48 inputs and 48 outputs by the switch fabric unit using selectors. Thus, the scale of the switch fabric unit increases.

Further, for example, 144 2×2 switches (6 stages) and 24 memories are used to achieve the capacity of 24 inputs and 24 outputs by a switch fabric unit using multi-stage switches. On the other hand, for example, 336 2×2 switches (7 stages) and 48 memories are used to achieve the capacity of 48 inputs and 48 outputs by the switch fabric unit using multi-stage switches. Thus, the scale of the switch fabric unit increases.

On the other hand, it is sufficient for the line switching device 100 to use 2 switch fabric units 115 each of which includes 24 selectors with 48 inputs and 1 output and 24 memories to achieve the capacity of 48 inputs and 48 outputs, thereby achieving high capacity without increasing the scale of the switch fabric unit 115.

Each of the switch fabric units 115 according to the embodiment can be configured not to write into the memory 903, line setting information indicating destinations of signals that are of the input signals and have destinations not connected to the switch fabric unit 115, thereby reducing the amount of line setting information read/written by the switch fabric unit 115 and preventing conflict between the write process and the read process in the memory 903.

Each of the switch fabric units 115 performs line setting according to the timings based on the timing pulses output from the synchronizing unit 130, thereby synchronizing the timings of the line setting performed by multiple switch fabric units 115 and stabilizing the transmission process performed by the interface unit 111.

Each of the switch fabric units 115 detects a change in the timings indicated by the timing pulses, and temporarily suspends a read process of the line setting information, thereby preventing an error from occurring in the line setting information even when the timing pulses are disturbed due to an irregular operation such as attachment/detachment of the switch fabric unit 115, and stabilizing the line setting.

As described above, according to the line switching device, lines can be arbitrarily switched even when multiple switch fabric units are used.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A line switching device comprising:
    a first switching device that includes:
        a plurality of first input ports to which first signals are input; and
        a plurality of first output ports, and
    a second switching device that includes:
        a plurality of second input ports to which second signals are input; and
        a plurality of second output ports, and
    a generator that generates timing pulses indicating periodic timings, wherein
    the first switching device further includes a first switch that includes:
        a write unit that writes at first timings that are based on the timing pulses generated by the generator, setting information for a signal that is to be switched to one of the first output ports; and
        a read unit that reads at second timings that are based on the timing pulses, the setting information written into a memory by the write unit, wherein the read unit temporarily suspends reading of the setting information when the timings indicated by the timing pulses have changed, and
    that selectively outputs, among the first signals input to the first switching device through the first input ports and branched signals branched from the second signals input to the second switching device through the second input ports, the signal to one of the first output ports indicated by the setting information read by the read unit, and
    the second switching device further includes a second switch that selectively outputs, among the second signals input to the second switching device through the second input ports and branched signals branched from the first signals input to the first switching device through the first input ports, a signal that is to be switched to any one of the second output ports of the second switching device.

2. The line switching device according to claim 1, wherein the first switching device further includes a first branch unit that branches the first signals input from the first input ports and outputs the branched signals to the second switching device, and
the second switching device further includes a second branch unit that branches the second signals input from the second input ports and outputs the branched signals to the first switching device.

3. The line switching device according to claim 1, wherein the write unit does not write into the memory, setting information for a signal that is to be switched to an output port other than the first output ports.

4. The line switching device according to claim 1, wherein the first switch includes:
    a selector that outputs only signals that are to be switched to the first output ports; and
    a switch that outputs the signals from the selector to the first output ports.

5. The line switching device according to claim 1, wherein the read unit temporarily suspends reading of the setting information but does not suspend writing of the setting information when the timings indicated by the timing pulses have changed.

* * * * *